United States Patent
Sawada

(10) Patent No.: US 6,735,619 B1
(45) Date of Patent: May 11, 2004

(54) HOME NETWORK GATEWAY APPARATUS AND HOME NETWORK DEVICE

(75) Inventor: Toshihisa Sawada, Chiba (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 0 days.

(21) Appl. No.: 09/497,181

(22) Filed: Feb. 3, 2000

(30) Foreign Application Priority Data

Aug. 10, 1999 (JP) .......................................... 11-226204

(51) Int. Cl.[7] .............................................. G06F 15/16
(52) U.S. Cl. ...................... 709/212; 709/217; 709/227; 709/245; 345/329
(58) Field of Search ............................... 709/217, 227, 709/212, 245; 345/329

(56) References Cited

U.S. PATENT DOCUMENTS

| | | | |
|---|---|---|---|
| 6,018,690 A | | 1/2000 | Saito et al. |
| 6,288,716 B1 | * | 9/2001 | Humpleman et al. ....... 345/329 |
| 6,434,627 B1 | * | 8/2002 | Millet et al. ................ 709/245 |
| 6,523,696 B1 | | 2/2003 | Saito et al. |
| 2002/0152311 A1 | * | 10/2002 | Veltman et al. ............. 709/227 |
| 2003/0026273 A1 | * | 2/2003 | Davison et al. ............. 370/409 |

FOREIGN PATENT DOCUMENTS

| | | | | |
|---|---|---|---|---|
| EP | 0930747 | | 7/1999 | |
| JP | 10-94199 | | 4/1998 | |
| JP | 10-191463 | * | 7/1998 | ............ H04Q/9/00 |
| JP | 11-88378 | | 3/1999 | |
| JP | 11-88965 | | 3/1999 | |
| JP | 11177569 | | 7/1999 | |
| JP | 11187061 | | 7/1999 | |
| JP | 11205363 | | 7/1999 | |

OTHER PUBLICATIONS

Chen, Walter Y. "Emerging Home Digital Networking Needs." 1997. Texas Instrument Inc. pp. 7–12.*
Saito et al., "Home Gateway Architecture Considering Digital Home Appliances", The Institute of Electronics, Information And Communication Engineers, 1998 Communication Society Autumn Convention Lecture Papers 2, B–7–145, Sep. 7, 1998, Toshiba Corp. R&D Center, p. 266, 1998, together with partial English Language Translation.
Saito et al., "Homenetwork Architecture Considering Digital Home Appliances", The Institute of Electronics, Information And Communication Engineers (Technical Report of IEICE), IN97–128 (Nov. 1997), pp. 57–64, together with a partial English Language Translation.
English Language Abstract of JP 10–94199.
English Language Abstract of JP 11–205363.
English Language Abstract of JP 10–191463.
English Language Abstract of JP 11–88378.
English Language Abstract of JP 11–88965.
English Language Abstract of JP 11–177569.

* cited by examiner

Primary Examiner—David Wiley
Assistant Examiner—Alina Boutah
(74) Attorney, Agent, or Firm—Greenblum & Bernstein, P.L.C.

(57) ABSTRACT

A home network gateway apparatus controls information of home network devices connected to an IEEE 1394 bus in a unified manner in a household. When a device is connected to the home network, the home network gateway apparatus of the present invention acquires information of each device and posts the information on a built-in WWW server in a list menu format. The user can remotely control home network devices individually from an apparatus on another network via the list menu.

6 Claims, 13 Drawing Sheets

| Panasonic LAMP A-10 | 11 |
|---|---|
| Panasonic Camera B-20 | 12 |

| NODE ID | UNIQUE ID (EUI−64) |
|---|---|
| 0X00 | 0X0080450000000000A |

FIG.9A

| NODE ID | UNIQUE ID (EUI−64) |
|---|---|
| 0X00 | 0X00C08F000000000B |
| 0X01 | 0X0080450000000000A |

FIG.9B

```
<HTML>
<HEAD>
<TITLE>Homemenu</TITLE>
</HEAD>
<BODY>
<A HRFE="d00c08f0000000b/menu.shtml">Panasonic LAMP A-10 11</A><BR>
<A HREF="d00e05c0000000c/menu.shtml">Panasonic Camera B-10 12</A><BR>
</BODY>
</HTML>
```

FIG.12

```
<HTML>
 <HEAD>
  <TITLE>Menu</TITLE>
 </HEAD>

<FORM ACTION="onoff. cgi"METHOD="POST">

</HTML>
```

FIG.13

HOME NETWORK GATEWAY APPARATUS AND HOME NETWORK DEVICE

BACKGROUND OF THE INVENTION

1. Field of the Invention

The present invention relates to a home network gateway apparatus and home network device.

A home network device refers to an electrical device connected to a home network such as TV, video camera and lamp.

A home network gateway apparatus refers to an interface apparatus placed between the home network and a wide-area network such as the Internet.

2. Description of the Related Art

An example of a home network device remotely controlled via a public telephone channel is described in the Japanese Patent Application No. HEI 10-191463.

However, conventional technologies are unable to remotely control home network devices using a wide-area computer network such as the Internet.

Moreover, when a home network device is newly installed or removed, the user must update information of devices connected to the home network. It is therefore troublesome to control home those network devices.

SUMMARY OF THE INVENTION

It is an objective of the present invention to remotely control home network devices using a wide-area computer network such as the Internet. It is another objective of the present invention to make it easy to control information of the home network devices.

In the present invention, a home network gateway apparatus automatically acquires information of the devices connected to the home network and stores the information in connection with those devices.

Then, when accessed by a device incorporating a WWW browser on another network, the home network gateway apparatus sends necessary information to the device and displays a list of home network devices on the display of the device.

If the user clicks on an icon in the list displayed, the gateway apparatus sends control information corresponding to the icon to the home network device and operates the home network device as instructed by the user.

When a home network device is connected to the network, the home gateway apparatus of the present invention automatically acquires and stores information of the device, for example, information to create a list of homepages or information to control the operation of the home network device. Therefore, the user needs not to set the device information.

Moreover, the home gateway apparatus of the present invention functions as a home server. Therefore, an external device only needs to access the gateway apparatus. Other home devices need not to mount a server function and is therefore advantageous in the aspect of cost.

According to an preferred mode of the home network gateway apparatus of the present invention, when a device is connected to the home network, the home network gateway apparatus acquires and stores identification information, screen creation information and device operation information output from the device. Then, the home network gateway apparatus posts information of all devices connected to the home network in a list menu form on a built-in WWW server.

This allows the user to exercise concentrated control over the home network devices through the homepage list and remotely control the home network devices via the homepage.

In another mode of the home network gateway apparatus, if the connection of a home network device to the home network is canceled, the information of the device is deleted from the list menu.

This makes it possible not only to automatically detect connection/cancellation of connection of a home device to the network but also to automatically add/delete control information to/from the list through the homepage of the device.

In another mode of the home network gateway apparatus of the present invention, when instructed by an apparatus incorporating a WWW browser on the home network or a network other than the home network to remotely control the home network device via the list menu, the home network gateway apparatus sends control information to the home network device based on the device operation information and makes the device execute the operation as instructed.

This makes it possible to remotely control the home network device via the homepage.

In another mode of the home network gateway apparatus of the present invention, if a device is connected to the home network, the home network gateway apparatus acquires identification information and download server address information output from the home network apparatus. The home network gateway apparatus then accesses the download server based on the address information and downloads and stores the screen creation information and device operation information on the home network device. The home network gateway apparatus then posts information of all devices connected to the home network in a list menu form on a built-in WWW server.

In another mode of the home network gateway apparatus, if connection of a home network device to the home network is canceled, the home network gateway apparatus automatically deletes the information of the device from the list menu.

In another mode of the home network gateway apparatus, when instructed by an apparatus incorporating. a WWW browser on the home network or a network other than the home network to remotely control the home network device via the list menu, the home network gateway apparatus sends control information to the home network device based on the device operation information and makes the device execute the operation as instructed.

This makes it possible to remotely control the home device via the homepage.

In another mode of the home network device of the present invention, a function is provided to output information stored beforehand of the own device to the home network gateway apparatus at the time of connection to the network.

The present invention makes it easy to control home network devices. The present invention also allows a remote control of home network devices using a network such as the Internet.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 9A is a diagram showing the content of a mapping table (table of correspondence between node ID and unique ID) before a new device is connected;

FIG. 9B is a diagram showing the content of a mapping table (table of correspondence between node ID and unique ID) after a new device is connected;

FIG. 12 is a diagram showing an example of HTML description composing a display screen of a home network device; and FIG. 13 is a diagram showing a part of HTML description to form a menu screen of a home network device (lamp).

DETAILED DESCRIPTION OF THE PREFERRED EMBODIMENTS

With reference now to the attached drawings, the embodiments of the present invention are explained below.

Figure 1:
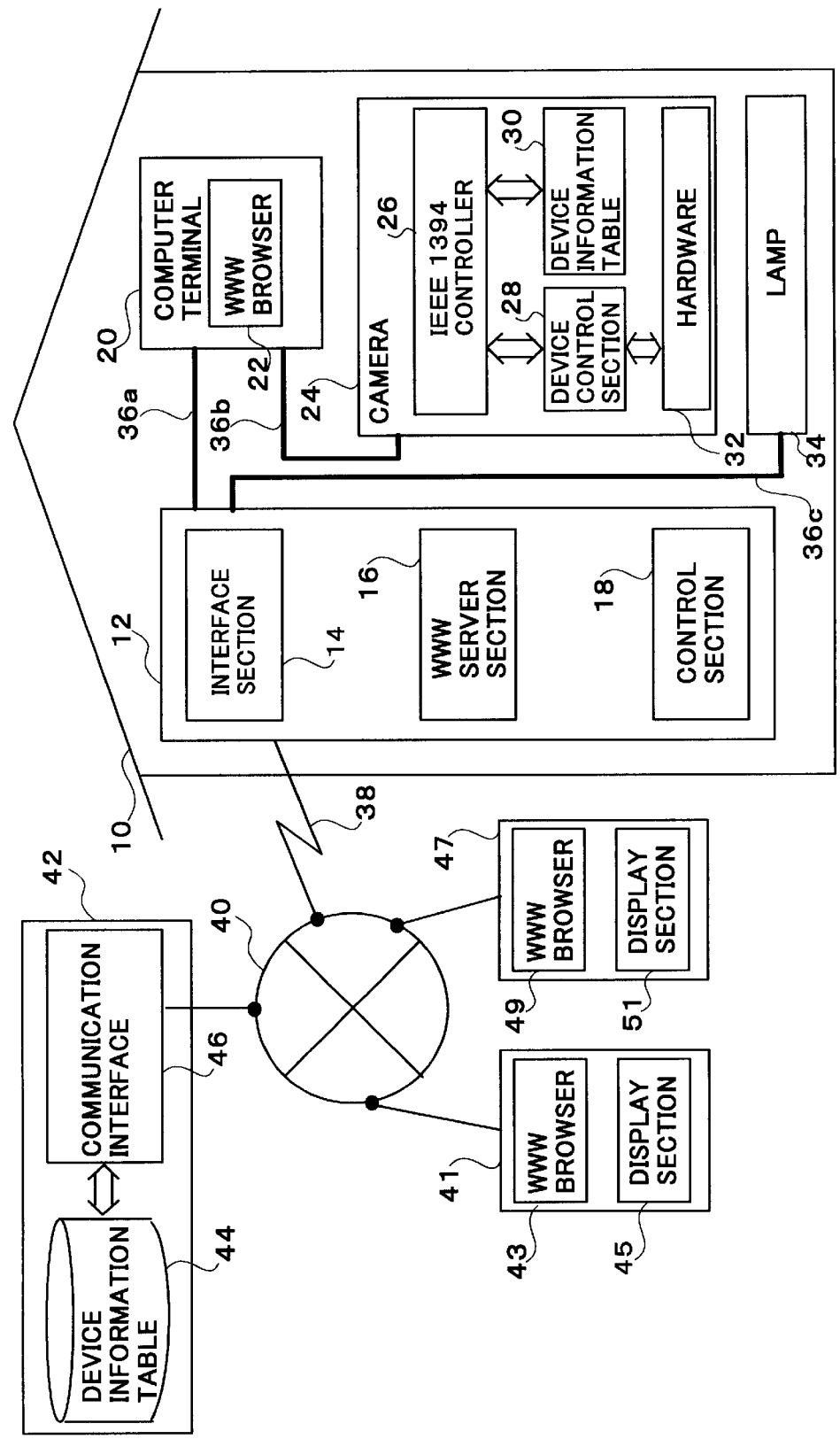
FIG. 1 is a block diagram showing an overall configuration of a system to externally control home network devices.

FIG. 1 is a block diagram showing an overall configuration of a system to operate a home network device (hereinafter also referred to as "home device") from a terminal on the Internet.

As illustrated in the figure, a home network system is formed in a household 10 by connecting different devices via IEEE-1394-compliant serial buses (hereinafter referred to as "IEEE 1394 buses") 36a, 36b and 36c.

In FIG. 1, there are electronic devices connected to the home network such as computer terminal 20, video camera 24 and lamp 34. Computer terminal 20 incorporates WWW browser 22.

Video camera 24 comprises IEEE 1394 controller 26, device control section 28, device information table 30 and hardware 32 whose operation is controlled by device control section 28.

Device information table 30 stores an HTML description for screen formation and CGI script for device control.

Home network gateway apparatus (hereinafter also referred to as "gateway apparatus") 12 controls information on devices in a unified way.

The gateway apparatus also has an information distribution function via a network. That is, the gateway apparatus has a function as a home server.

This gateway apparatus 12 comprises communication interface section 14, WWW server 16 and control section 18.

Communication interface 14 comprises an Internet interface circuit and an IEEE 1394 bus interface circuit. WWW server 16 controls information on devices in a unified way and also has a function of distributing necessary information to devices. Control section 18 controls the operations of different devices in a centralized manner.

When a device is connected to the home network, this gateway apparatus 12 detects the device and recognizes its node ID and unique ID (will be explained later). When information stored in device information table 30 is sent from each device, gateway apparatus 12 stores and relates this information to the unique ID of the device and stores the information in WWW server 16.

This home network gateway apparatus 12 is connected to network 38 all the time via communication channel 38 such as ISDN and CATV.

On the other hand, computer terminals 41 and 47 are connected to wide-area network 40 such as the Internet.

These terminals incorporate WWW browsers 43 and 49 and can display their homepages on display sections 45 and 51.

Terminals 41 and 47 can access gateway apparatus 12 via wide-area network 40 and communication channel 38 such as ISDN and CATV, investigate connection information of devices on the home network and remotely control the devices individually. download server 42 includes, inter alia, a device information table 44 in communication with a communications interface 46 as illustrated in FIG. 1.

Using this download server 42 only needs to store the address (URL) of the download server on the Internet in device information table 30 incorporated in each home device.

That is, in this case, when a home device is connected to the home network, each home device sends the address information and gateway apparatus 12 automatically acquires this. Then, gateway apparatus 12 accesses a predetermined address of the download server and downloads necessary information.

Figure 2:
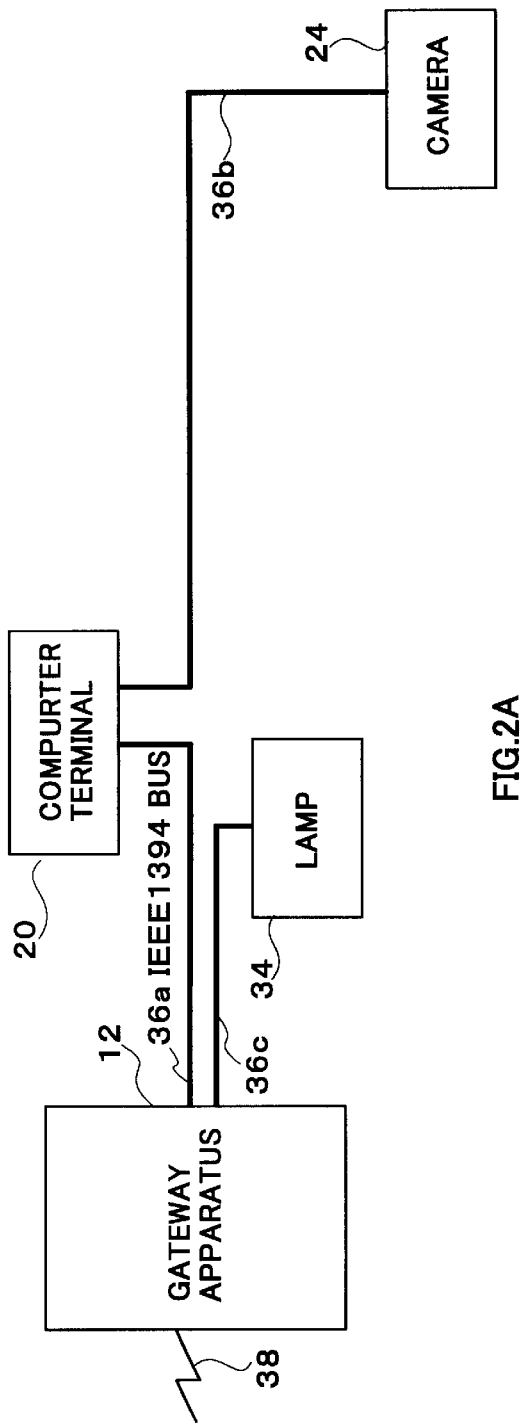
FIG. 2A is a block diagram showing a home network configuration.
FIG. 2B is a diagram showing URL (Uniform Resource Locator) and IP (Internet Protocol) addresses of a home network gateway apparatus.
FIG. 2C is a diagram showing the IP address and EUI-64 (Extended Unique Identifier 64 bits, also called "Global Unique ID") on the home network of the home network gateway apparatus.
FIG. 2D is a diagram showing the IP address and EUI-64 (Extended Unique Identifier 64 bits, also called "Global Unique ID") on the home network of a computer terminal apparatus.
FIG. 2E is the EUI-64 (Extended Unique Identifier 64 bits, also called "Global Unique ID") of a lamp.
FIG. 2F is the EUI-64 (Extended Unique Identifier 64 bits, also called "Global Unique ID") of a camera.

FIG. 2A is a diagram to explain the function and connection relationship of the home network gateway apparatus and a home network device (hereinafter referred to as "home device") more specifically.

The home network is formed using an IEEE 1394 serial bus.

Gateway apparatus 12 functions as an interface apparatus between the wide-area network (Internet) and home network. This gateway apparatus 12 is equipped with an IP (Internet Protocol) router function and a WWW server function.

The IP address of gateway apparatus 12 is "133.185.nnn.1:nnn=0 to 255". The gateway apparatus is connected to the Internet all the time.

Gateway apparatus 12 is connected to home devices having IP addresses such as a computer terminal at an IP level according to an IP over 1394 protocol. Gateway apparatus 12 is further connected to home devices without IP addresses at a non-IP level.

IP addresses of home devices within the home network are automatically assigned by a DHCP (Dynamic Host Configuration Protocol) function of gateway apparatus 12.

That is, as shown in FIG. 2C, gateway apparatus 12 is assigned "192.168.10.1". Furthermore, as shown in FIG. 2D, computer terminal 20 is assigned "192.168.10.2".

On the other hand, as an IEEE 1394 address, a specific address of EUI-64 (Extended Unique Identifier 64 bits, also called "Global Unique ID") is used.

This EUI-64 (hereinafter mainly referred to as "unique ID") is an ID number specific to each device and consists of 64-bit data including a manufacturer name and serial number.

As shown in FIG. 2C, the unique ID of gateway apparatus 12 is 0X0000EB0000000009.

As shown in FIG. 2E, the unique ID of lamp 34 is 0X00c08F000000000B.

As shown in FIG. 2F, the unique ID of camera 24 is 0X00E05C00000000C.

As shown in FIG. 2D, the unique ID of computer terminal 20 is 0X008045000000000A.

"0X" at the beginning of the numbers above indicates hexadecimal notation. This notation is also used in the following explanations.

Gateway apparatus 12 has a WWW server function and is assigned a URL "//www.home12345.shiroi.chiba.jp/", for example (FIG. 2B). Gateway apparatus 12 is therefore accessible from a WWW browser of a computer terminal on another network.

As explained in FIG. 1, at least one download WWW server 42 exists on the Internet 40 that stores an operation program of each home device and allows downloading under certain conditions.

Figure 3:
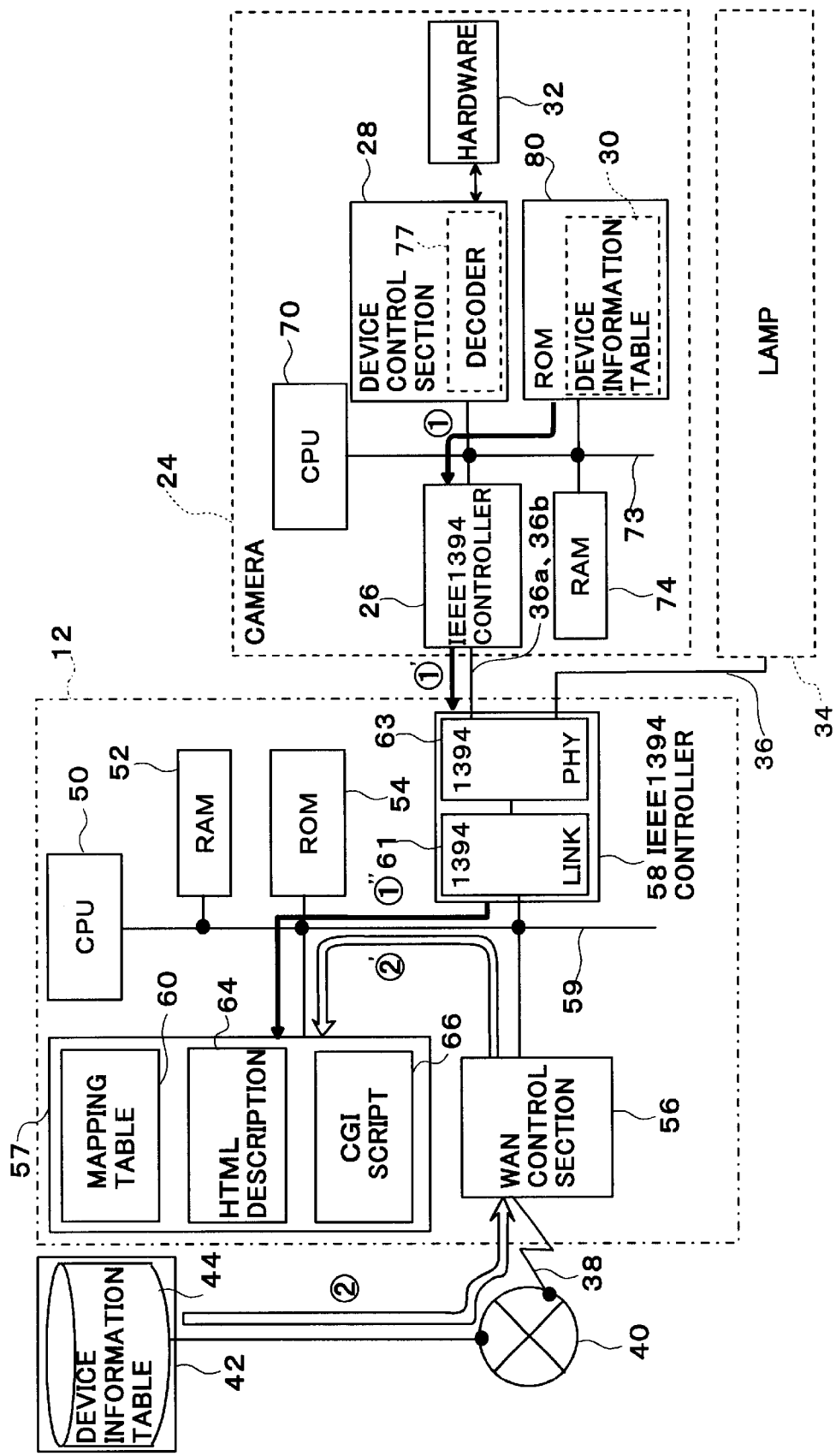
FIG. 3 is a block diagram showing a specific configuration of the system to externally control the home network devices.

FIG. 3 is a block diagram showing a specific configuration of a system to externally control home network devices.

CPU 50 incorporated in gateway apparatus 12 carries out control over the entire apparatus. That is, CPU 50 corresponds to control section 18 in FIG. 1.

Furthermore, ROM 54, RAM 52, IEEE 1394 controller 58, WAN control section 56 and auxiliary storage apparatus 57 are connected to CPU 50 via internal bus 59.

ROM 54 stores a program executed by CPU 50. RAM 52 provides a program work area and a storage area to temporarily store data transmitted/received to/from external devices, etc.

Auxiliary storage apparatus 57 consists of recording media such as hard disk and is used to store WWW server data, etc. That is, auxiliary storage apparatus 57 stores device information related to each home device. More specifically, auxiliary storage apparatus 57 contains mapping table 60, HTML description 64 and CGI script 66.

Mapping table 60 is a table to control the correspondence between node IDs and unique IDs of home devices.

HTML description 64 is information to create homepage screens.

CGI script 66 is a program to operate home devices.

WAN control section 56 consists of an ISDN or CATV interface and is connected to the Internet all the time.

IEEE 1394 controller 58 provides an input/output interface for the IEEE 1394 serial bus and carries out transmission/reception to/from home devices 24 and 34 on the bus.

WAN control section 56 and IEEE 1394 controller 58 correspond to interface section 14 in FIG. 1.

When a home device is connected to the IEEE bus and a bus reset is output, IEEE 1394 controller 58 detects this. This detection triggers plug and play to be executed thereafter consisting of reading a node ID, collecting device information output from the newly connected home device and storing the information in auxiliary storage apparatus 57 in a predetermined format.

IEEE 1394 controller 58 shown in FIG. 3 comprises 1394LINK (reference code 61) and 1394PHY (reference code 63).

The IEEE 1394 layer and 1394PHY layer are used to carry out communication control of the LINK layer and physical layer of the communication protocol, respectively and have the same functions as those defined by the general IEEE 1394 standard.

IEEE 1394 controller 58 detects an interrupt generated when connection/disconnection of a device takes place. Controller 58 controls the node ID, etc. of the home device, issues a request for extracting the device information to the home device and reads the device information stored in the device information table in the home device.

The IEEE 1394 standard is quite different from the SCSI standard in that the IEEE 1394 standard supports a plug and play function. That is, the IEEE 1394 standard has a mechanism that automatically assigns an ID even if a device is additionally connected at the startup or during operation. Therefore, when a home device is connected to the network, a bus reset is issued and the ID numbers of the home devices connected to the network are updated.

The present embodiment focuses on the plug and play function that the IEEE 1394 originally has and enhances that function. That is, the present embodiment enhances the plug and play function by adding a function of automatically reading information specific to each home device, that is, information necessary for remote control, etc.

Information control section 16 shown in FIG. 1 is constructed by CPU 50, auxiliary recording apparatus 57 and IEEE 1394 controller 58 in gateway apparatus 12.

Then, the configuration of video camera 24 with an additional function compatible with the IEEE 1394 shown on the right side of FIG. 3 is explained.

CPU 70 controls the operation of the video camera in a centralized manner. ROM 80, RAM 74, IEEE 1394 controller 26 and device control section 28 are connected to CPU 70 via internal bus 73.

Device control section 28 incorporates decoder 77. ROM 80 incorporates device information table 30.

ROM 80 stores a program executed by CPU 70 and device information transferred to gateway apparatus 12, etc.

The device information contains HTML (Hyper Text Markup Language) description and CGI (Common Gateway Interface) script. This information is stored in device information table 30.

RAM 74 is used as a work area of programs and storage area to temporarily store data transmitted/received to/from an external device, etc.

IEEE 1394 controller 26 functions as an interface circuit to transmit/receive data to/from other devices on the IEEE 1394 serial bus.

Decoder 77 incorporated in device control section 28 decodes the meaning of data that gateway apparatus 12 writes to a specific address space and determines what operation is instructed.

Device control section 28 controls the operation of hardware 32 according to the instruction. Furthermore, lamp 34 (described in FIG. 1) that supports the IEEE-1394-compliant function also has the same configuration.

Arrows ①, ①' and ①" with a bold black solid line in FIG. 3 indicate the route that the device information held by video camera 24 passes when transferred to auxiliary storage apparatus 57 in gateway apparatus 12.

That is, the information stored in the device information table is transferred to gateway apparatus 12 while the device is connected to the home network, stored in auxiliary storage apparatus 57 in gateway apparatus 12 in a predetermined format.

In this way, mapping table 60 that indicates a correlation between the node ID and unique ID of each device, HTML description 64 which is the screen formation information of each device, CGI script 66 which is the information for device operation and control are stored in gateway apparatus 12. In this way, gateway apparatus 12 is set in a state awaiting access from an external network.

On the other hand, when the information of each device is downloaded from download server 42, the transfer route for the device information is indicated by white bold arrows ② and ②'.

Device information table 30 of each home device stores the URL of the download server. When a home device is connected to the home network, gateway apparatus 12 temporarily stores the URL information output from the home device in auxiliary storage apparatus 57. Then, gateway apparatus 12 accesses device information table 44 in download server 42 and downloads the HTML information on the device and information including the CGI script.

Use of this download server allows the control program of a device to be freely changed as required even after the home device has been installed.

Figures 4A, 4B:
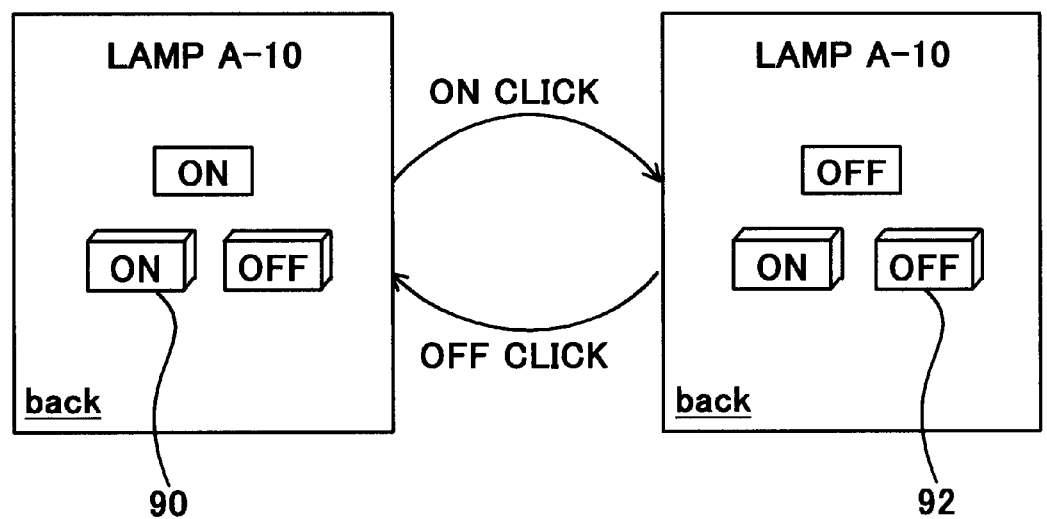
FIG. 4A is a diagram showing an example of an initial screen displayed on a terminal on a wide-area network.
FIG. 4B is a diagram showing an example of a device control screen displayed on a terminal on a wide-area network.

FIG. 4A and FIG. 4B are screen examples shown on the display (reference code 45 of FIG. 1) of the computer terminal when the user remotely controls devices.

As shown in FIG. 4A, the initial screen shows a list of devices connected to the home network.

Here, if the user clicks on the "LAMP" line, an operation screen about the lamp is displayed as shown on the left side of FIG. 4B.

If the user clicks on button 90 that instructs turning ON of the lamp, the operation of turning ON the lamp is executed through remote control. At the same time, the screen on the display changes to the menu screen as shown on the right side of FIG. 4B.

Then, if the user clicks on button 92 that instructs turning OFF the lamp, the operation of turning OFF the lamp is executed through remote control. At the same time, the screen returns to the menu screen shown on the left side of FIG. 4B.

Then, a detailed explanation is given about addressing to an address space and device information data format to carry out remote control of a device via the WWW browser.

Figure 5:
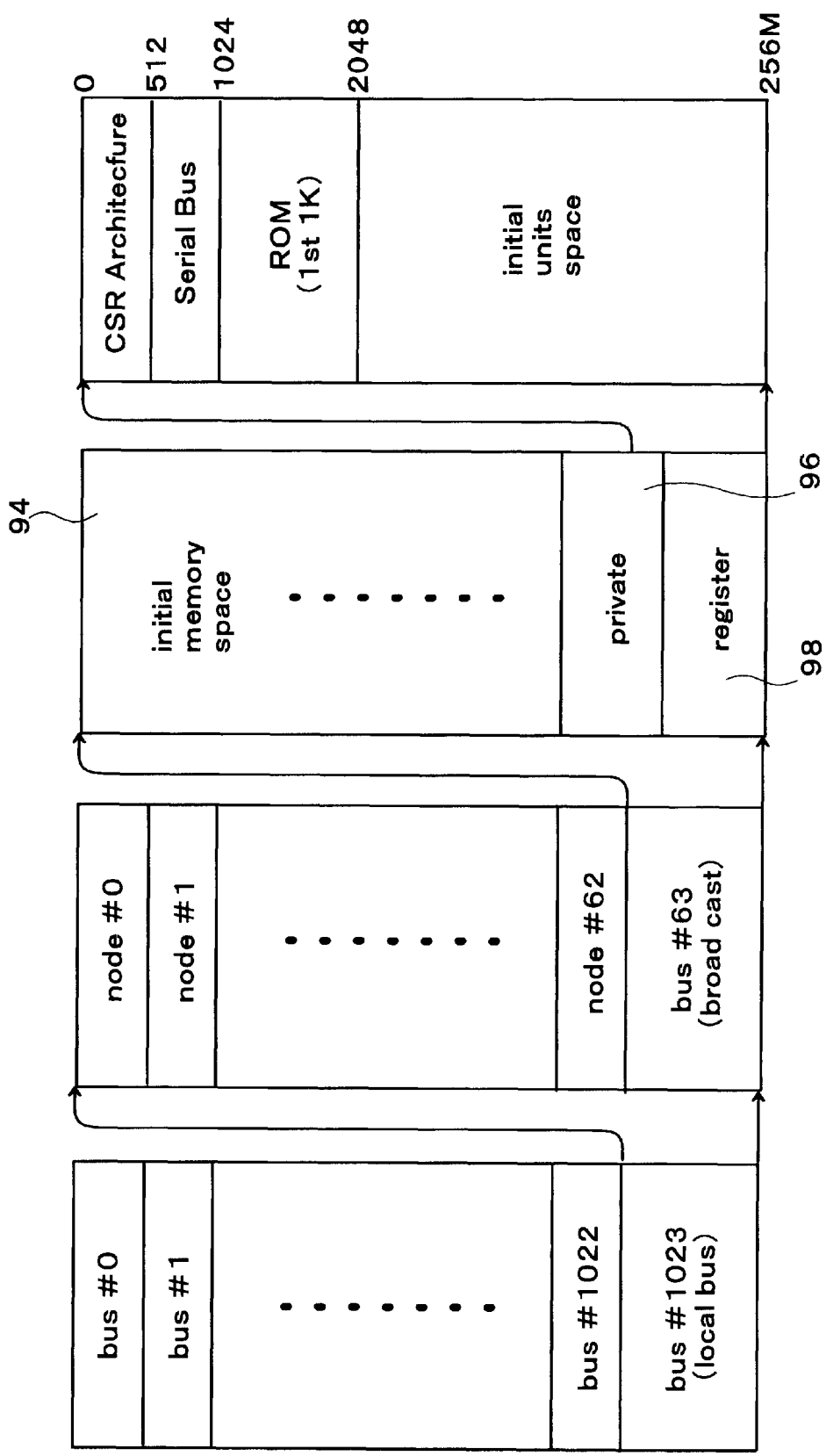
FIG. 5 is a diagram showing a configuration example of an address space according to the IEEE 1394 standard.

FIG. 5 shows a configuration of an address space in the system using the IEEE 1394 bus.

In the IEEE 1394 bus, a data transfer is equivalent to writing data to a predetermined mapped address space. Therefore, a data or control information transfer operation in the present embodiment is recognized as a data write/read to/from a predetermined address space.

FIG. 5 shows an address space in a home device.

Device information (device information table 30 in FIG. 1) held by each home device is stored in a free area of the register space (reference code 98 in FIG. 5). This free area is, for example, an area on and after offset value 3000 in the address space.

Register space 98 is an area used for information exchange between devices. The present embodiment uses a free area of this register space as the area for storing device information of each home device.

As shown in FIG. 5, the address space includes initial memory space 94 and private space 96.

All home network devices of the present invention are made applicable to the IEEE 1394 standard address space.

Figure 6:
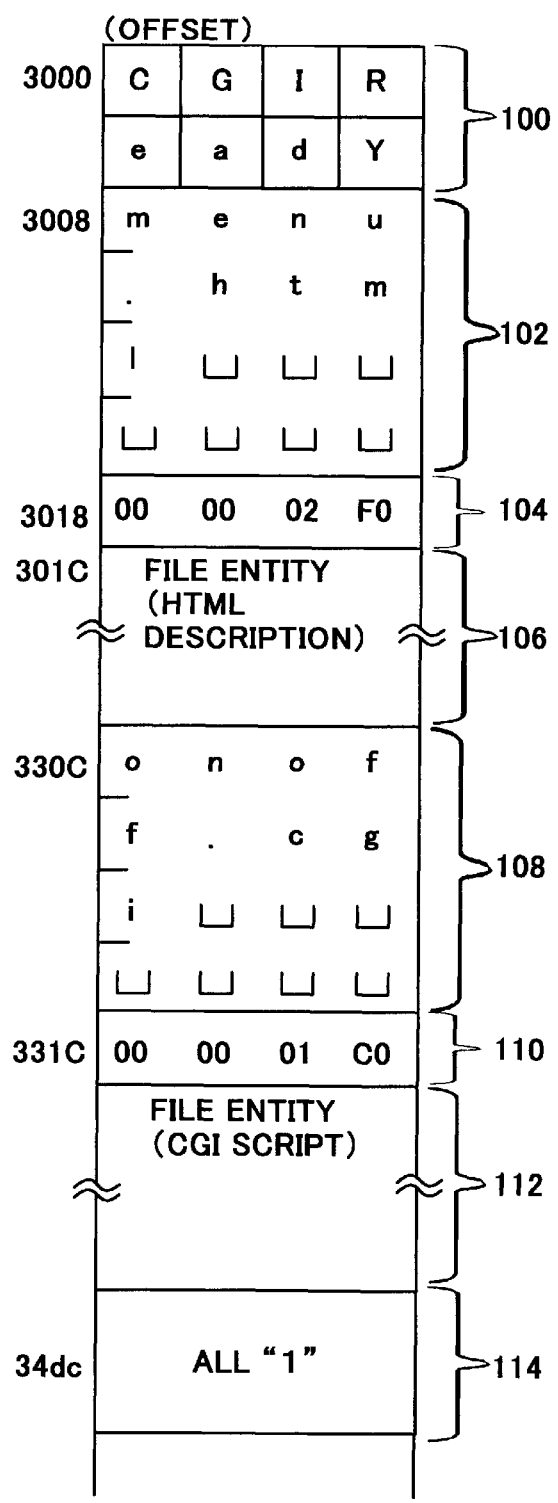
FIG. 6 is a diagram showing an example of data format for screen formation and control stored in an address space of each home network device.

FIG. 6 is a diagram showing a data format example of device information compliant with the IEEE 1394 standard.

This device information includes information for screen creation and information for remote control. This device information is stored in device information table 30 in FIG. 1.

The offset described in FIG. 6 indicates locations relative to 0XFFFFF0000000. The 48-bit area obtained by subtracting the bus ID and node ID from the 64-bit IEEE 1394 address is the area to be noted by the offset.

Information 106 for screen creation is described in HTML. CGI script 112 is the information for remote control of devices.

As shown in FIG. 6, "CGIReady" is described in 8-byte area 100 starting from offset value 0X3000.

The file name of a file described in HTML is written in 16-byte area 102 starting from offset 0X3008.

The data size of area 102 is fixed at 16 bytes. When all bit values in this part are "1", this indicates an end mark meaning that there are no more files. Area 104 indicates the file size.

The 4 bytes starting from offset value 0X3018 indicate the data size (number of bytes) of file 106 described in HTML.

The same structure is repeated hereafter. That is, area 108 indicating the file name of CGI script 112, area 110 indicating the file size, area 112 in which a CGI script is described, file name area (all "1" area) 114 indicating that there are no more files are provided hereafter.

Such a file structure of the device information is called "CGIReady structure" hereafter.

The file structure described above is the structure when ROM of each device contains an HTML file and CGI script information.

Figure 7:
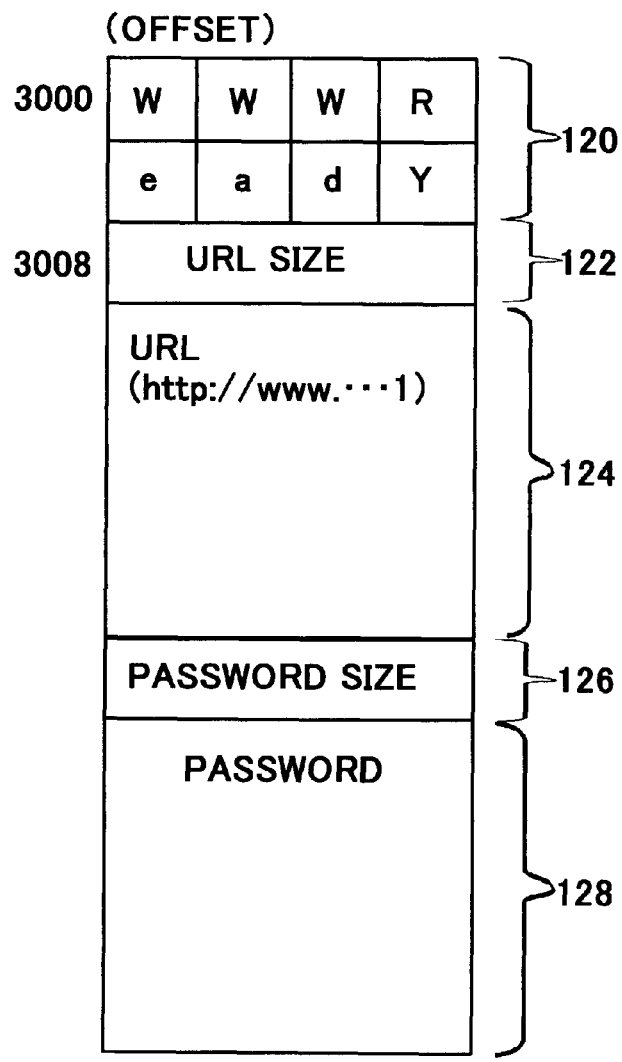
FIG. 7 is a diagram showing an example of data format for screen formation and control of a home network device stored in an address space of a download server on a wide-area network.

If the download server contains such information, only a WWWReady structure file is stored in the home device as shown in FIG. 7.

As shown in FIG. 7, this file consists of character "WWWReady" (reference code 120), data indicating the URL size (reference code 122), URL of the download server (reference code 124), data indicating the password size (reference code 126) and password (reference code 128).

A password is provided to prevent illegal access to the download server.

As shown above, a home device control program is written with a CGI script, which is described in HTML or interpreter language. Therefore, the home device control program can be read irrespective of what type of CPU or OS (Operating System) is incorporated in the gateway apparatus.

Furthermore, hardware control of home network devices can be implemented by a data read/write from/to a specific address in the IEEE 1394 address register space. Therefore, home devices can be controlled freely by determining the content of the CGI script.

Figure 8:
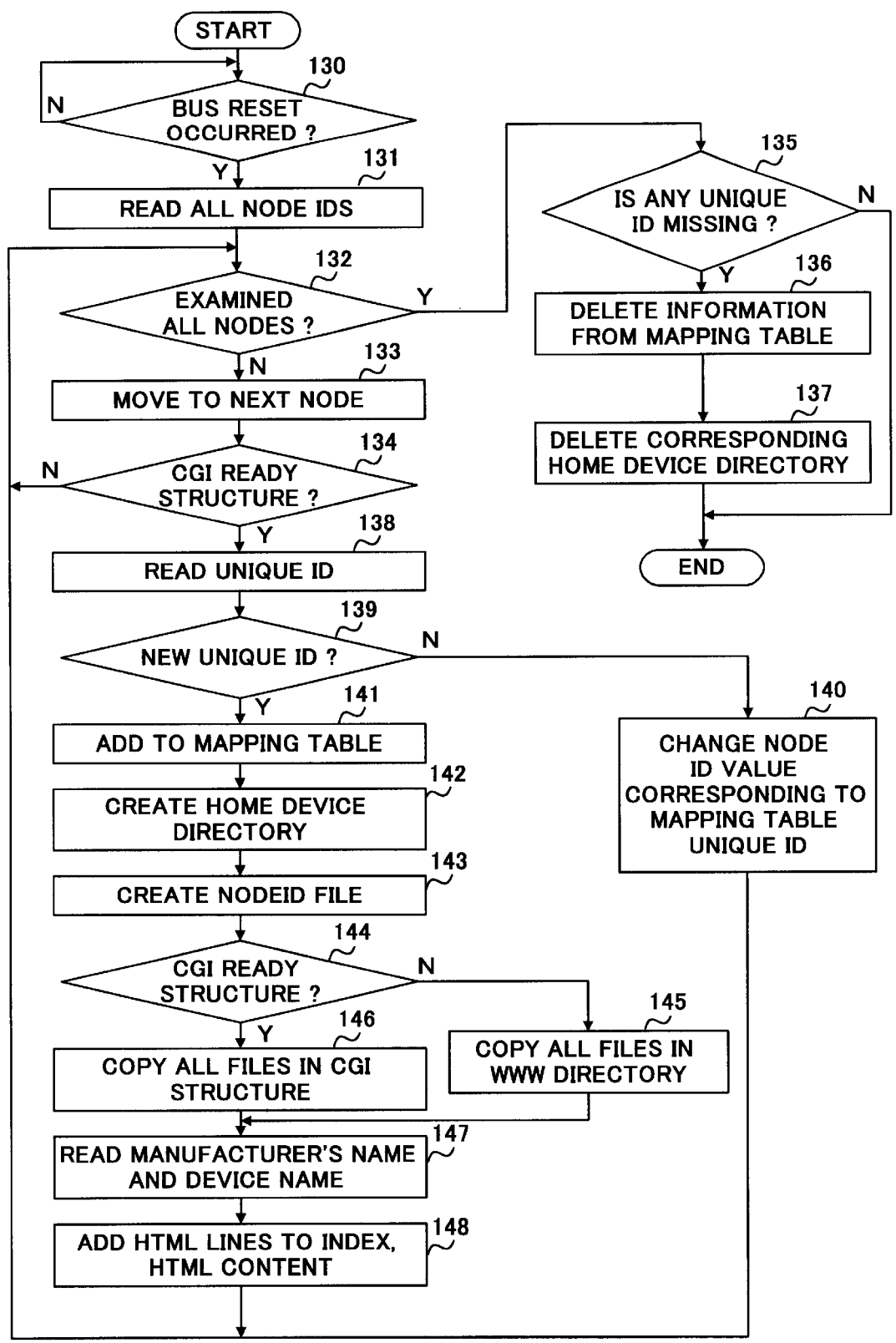
FIG. 8 is a flow chart showing a procedure executed by the home network gateway apparatus to enable a home network device newly connected to the home network to operate using a WWW browser.

Then, the operations executed by the gateway apparatus after a home device is connected to or separated from the IEEE 1394 serial bus until the home device can be operated by a WWW browser are explained using FIG. 8.

When, for example, a lamp is connected to the IEEE 1394 serial bus and a bus reset is issued, gateway apparatus 12 detects this (step 130). Then, gateway apparatus 12 checks the SelfID packet and acquires node IDs of all nodes on the IEEE 1394 serial bus (step 131).

Then, gateway apparatus 12 checks each node to see if the device information extracted from each device contains a CGIReady structure or WWWReady structure (steps 132, 133 and 134).

In the case of a CGIReady structure or WWWReady structure, gateway apparatus 12 reads the unique ID (EUI-64) of the node (step 138). Then, gateway apparatus 12 updates the mapping table (reference code 60 in FIG. 3) or files on the WWW server of the gateway apparatus 12 as follows:

If a new unique ID is found as a result of judgment in step 139, that is, when a new home device is connected, gateway apparatus 12 adds a combination of the unique ID and node ID to the mapping table (step 141).

Examples of adding to the correspondence table are shown in FIG. 9A and FIG. 9B.

FIG. 9A shows a correlation between the node ID and unique ID before the device is added.

When a new device is added and a bus reset is issued, all existing node IDs assigned to home devices so far are discarded and new node IDs are assigned. As a result, the unique ID of the newly added device corresponds to node "00", while the unique ID of the existing device corresponds to node "01".

Figure 10:
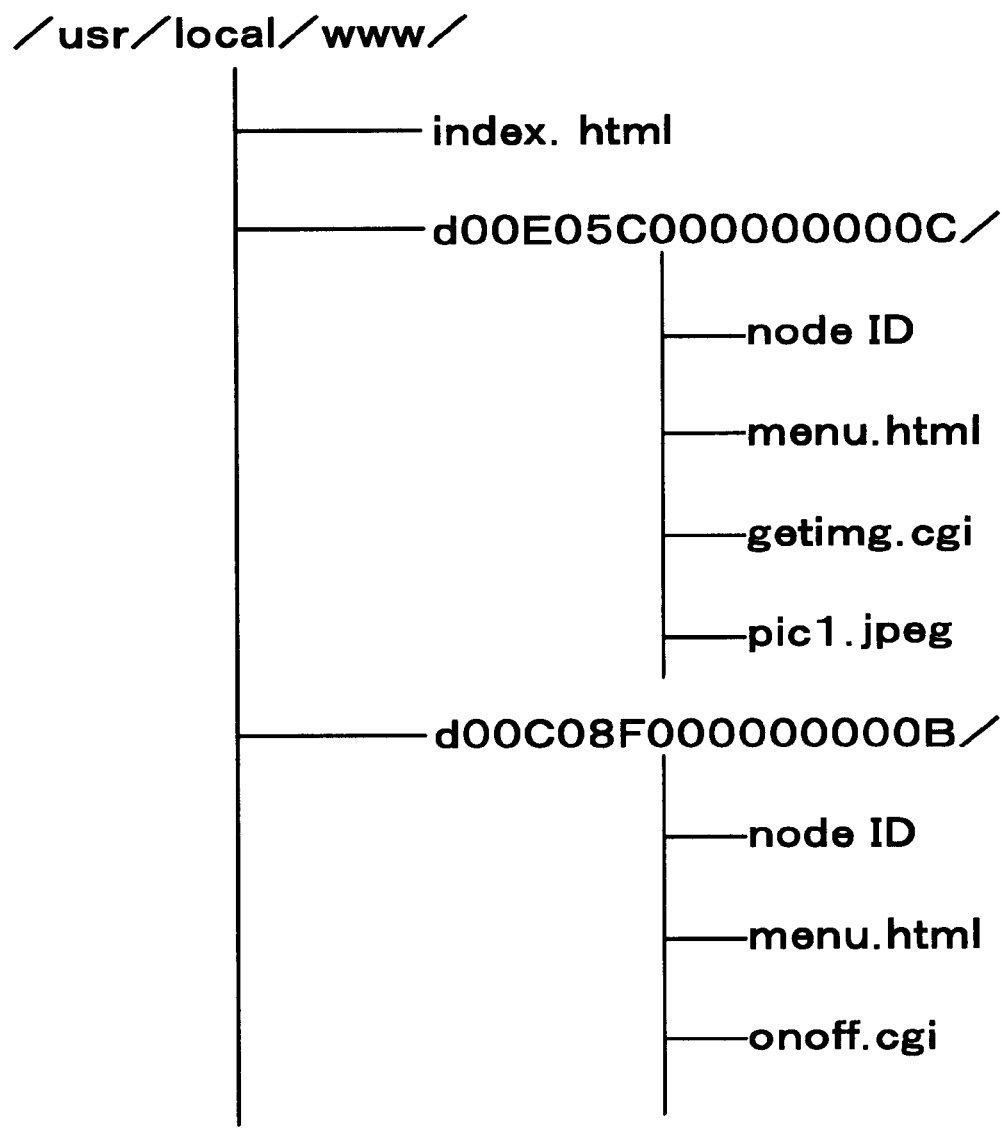
FIG. 10 is a diagram showing the content of a home directory (home network device control information)

After such an update of the correspondence table, gateway apparatus 12 creates a subdirectory (d00c08F000000000B in the example) including the same name as the unique ID value under the document directory (/usr/local/www/ in the example) of the HTTP daemon of the WWW server function (step 142, see FIG. 10).

This directory is called "home device directory". Then, various kinds of information as shown in FIG. 10 is added to the home device directory created by carrying out the following operation.

That is, a file containing the corresponding node ID value is created under the file name "nodeID" (step 143).

In the case of a CGIReady-structured file, a pair of the file name and HTML (or CGI script) in the structure is read. Then the file is created in the home device directory. Such an operation is carried out for all file names that exist in the CGIReady-structured file and HTML (or CGI script) (steps 144 and 146).

In the case of a WWWReady-structured file, all files on the WWW server directory indicated by the URL in the structure are copied in the home device directory (step 145).

For user authentication during a copy, the ID of the IC chip, for example, is used as the password in the WWWReady structure.

Then the device manufacturer's name and device name described in the configurationROM area in the IEEE 1394 address space are loaded (step 147).

Then, the HTML description lines to specify the device are added to the index.html file in the document root directory as shown in FIG. 12 (step 148).

In step 139, if the unique ID loaded is an existing unique ID, that is, a home device that has been connected so far, only the node ID item of the table of correspondence between node IDs and unique IDs is updated to a new node ID value. Then, the content of the nodeID file in the home device directory corresponding to the home device is rewritten to the new node ID value (step 140).

Moreover, in step 132, if the result of a check of all node IDs shows that some unique IDs not subject to the processing exist in the node ID/unique ID correspondence table (mapping table), it is determined that the home device having that unique ID value has been separated from the IEEE 1394 serial bus (step 135).

Then, the pair of the unique ID and node ID is deleted from the mapping table (step 136).

The corresponding home device directory is also deleted together with files therein and the description lines of the corresponding device in the index.html file are also deleted (step 137).

Figure 11:
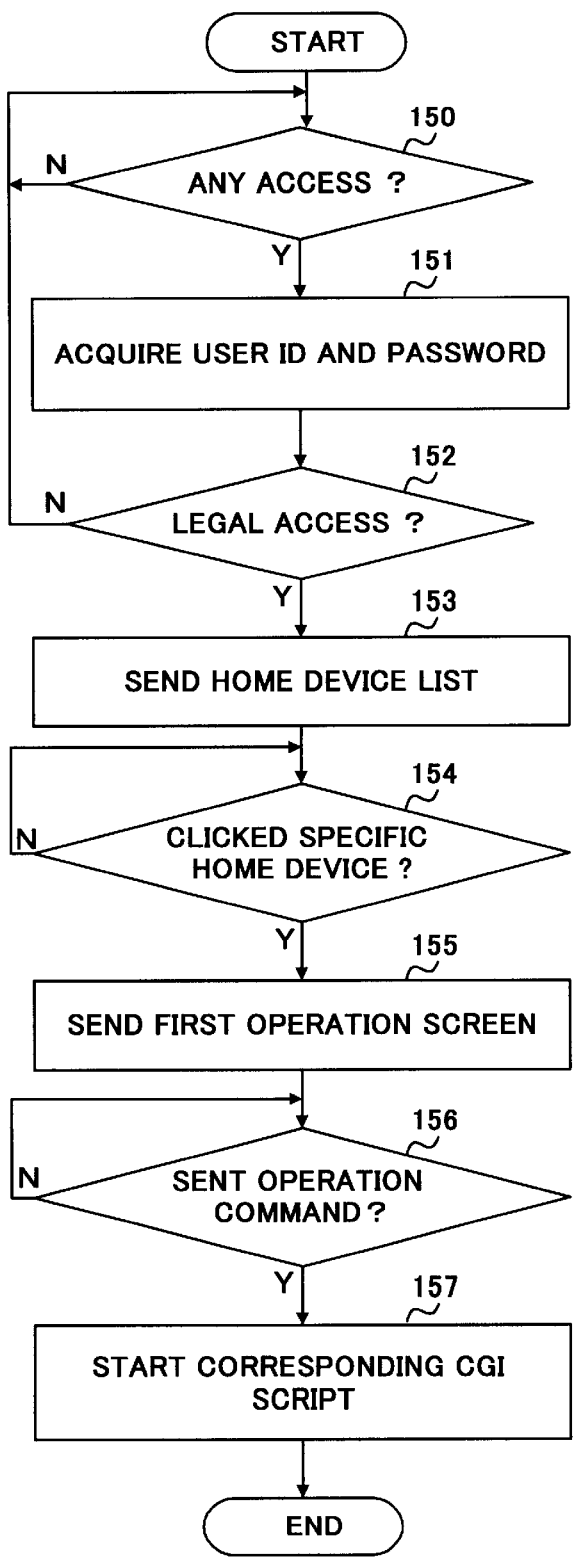
FIG. 11 is a flow chart showing a procedure example when a home network device is operated from a terminal on a wide-area network.

Then, the procedure executed by gateway apparatus 12 when a home device is operated from a terminal (WWW browser) on the wide-area network (or on the home network) is explained using FIG. 11.

In this case, gateway apparatus 12 functions as a WWW server.

That is, when an access request is received from a client (WWW browser) (step 150), an entry of the user-ID and password is prompted. Then, the user enters those IDs (step 151).

More specifically, it is desireable to let the client supply information including the Authorization header simultaneously, strictly determine the authenticity of the ID entered by this and strictly limit accesses to the home network (step 152).

To secure higher security, it is desirable to use SSL (Secure Sockets Layer), etc. to carry out personal authentication, data encryption/decryption.

Then, gateway apparatus 12 sends information of the home device list to the client (step 153). More specifically, an index.html file is sent as the first HTML data as shown in FIG. 12.

At this time, the display of the client terminal shows the initial screen as shown in FIG. 4A, that is, the list of devices connected to the home network.

Here, the client clicks on the display line of the lamp device on the screen (step 154). Then, a menu.html file that exists on the home device directory of the lamp as shown in FIG. 13 is sent (step 155).

As a result, the display of the client terminal shows a menu screen as shown in FIG. 4B, that is, the screen that allows operations specific to the home device.

Here, for example, the user instructs remote control to turn ON the lamp (step 156). Then, gateway apparatus 12 executes the onoff.cgi program (shown in FIG. 13) in the home directory. Then, gateway apparatus 12 writes specific data at a specific address in the IEEE 1394 address space of the home device (step 157).

Based on the data written, device control section 28 (shown in FIG. 1) controls hardware 30 and turns ON/OFF the lamp. The decoder provided for device control section 28 (reference number 77 in FIG. 3) decodes the meaning of the operation of the data written at the specific address.

Here, the value of the node ID of each home device on the IEEE 1394 serial bus changes every time a bus reset occurs. The address space of the target home device can always be specified.

As explained above, it is possible to remotely control home devices from a terminal on another network when the gateway apparatus supplies a screen showing the situation of connections of electronic devices and home appliances in a household and an operation screen as the homepage.

The main functions of the gateway apparatus explained above and home devices connected to the home network are summarized as follows:

The gateway apparatus controls connections of peripheral devices. More specifically, the gateway apparatus performs the following control tasks ① to ④:

① That is, when a home device is connected to the home network, the gateway apparatus recognizes this and collects its information, creates a list using an HTML description language and allows this list to be accessed from outside. This allows the user to see the information of this home device as a homepage from outside.

② A predetermined home device is added to the list only when the home device is connected. For example, only when a home device is connected to the home network and a command "CGIReady" is sent from the home device, that device is added to the list.

③ When the connection of the home device is canceled, the device is deleted from the list.

④ The plug and play function of the IEEE 1394 bus is enhanced and the support range is expanded from simple detection of attachment/detachment to include automatic collection of the node ID, unique ID and other device information, controlling individual information of devices connected to the home network automatically and in a unified way.

Furthermore, the gateway apparatus carries out processing for external accesses. That is, the gateway apparatus performs processing in ⑤ and ⑥ below:

⑤ If a terminal on another network accesses the URL of the gateway apparatus representing the household, the gateway apparatus distributes information of the list showing the situation of connections of home devices created in an HTML description language.

⑥ When a client clicks on a specific device, the gateway apparatus distributes the menu screen information. When a specific icon is clicked, the gateway apparatus writes data to a predetermined address space using a CGI script and controls the device individually.

Each home device has a device information output function and a function of operating a predetermined operation according to a control command from the gateway apparatus. More specifically, each home device performs operations ⑦ and ⑧ below:

⑦ That is, each home device has a bus reset signal transmission function corresponding to the plug and play of the IEEE 1394, a command indicating the predetermined device during the connection to the network and the node ID, unique ID, information and operation to create a homepage screen, control information, etc.

⑧ Each home device has a function of performing a predetermined operation according to a control command from the gateway apparatus.

By adding such functions to the home devices, it is possible to remotely control those devices. For example, it is possible to freely turn ON/OFF lighting of a room, turn ON/OFF a monitoring camera, tape record TV programs, etc. from a computer terminal outside or on the home network. Such a system can also be used, for example, to observe the situation of babies or elderly people under care.

In the explanations above, the IEEE 1394 bus is used to construct the home network, but the present invention is not limited to this and any network with an interface function that at least supports plug and play can also be used.

In the present invention as explained above, when an electronic device is connected to the home network, the gateway apparatus automatically acquires information on the screen formation and control information of the device allowing a WWW browser to display and operate the device.

This allows a terminal on a wide-area network such as the Internet to freely operate home network devices via a WWW browser. In this case, it is not necessary to know the address of each home device, but only accessing the URL representing that household, that is the URL of the home network gateway apparatus makes it possible to obtain a list of all home devices.

Furthermore, the gateway apparatus can automatically acquire device information according to attachment/detachment of each device to/from the home network, taking advantage of the plug and play function, a feature of the IEEE 1394 serial interface. This eliminates the need for a special setting for movement, new installation or addition of a device within the home network.

Furthermore, the gateway apparatus functions as a home server by controlling information of home device groups in a centralized manner, and therefore it is not necessary to incorporate the WWW server function in every device.

Moreover, since the method of downloading device information from a download server is used, it is possible to change the control program of the home device as required even after the installation of the device.

The present invention is not limited to the above described embodiments, and various variations and modifications may be possible without departing from the scope of the present invention.

This application is based on the Japanese Patent Application No. HEI 11-226204 filed on Aug. 10, 1999, entire content of which is expressly incorporated by reference herein.

What is claimed is:

1. A home network gateway apparatus connected to at least one device via a home network, the home network gateway being connected to a download server, external of the home network, which stores screen creation information and device operation information associated with the device, the home network gateway apparatus comprising:

an acceptor that, when at least one device is newly connected to the home network, receives identification information of the device and address information of the download server, outputted from the device;

a downloader that accesses the download server in accordance with the address information received from the newly connected device, and downloads the screen creation information and the device operation information associated with the newly connected device from the download server based upon the identification information;

a memory that stores the downloaded screen creation information and the downloaded device operation information; and a server that contains information of all devices connected to the home network, and upon receipt of access signal from a terminal, enables the terminal to display the information including screen creation information and device operation information that enables selection of a device and control of the selected device from the terminal, the terminal being external of the home network.

2. The home network gateway apparatus according to claim 1, wherein, when the connected device is disconnected from the home network, said server deletes the information regarding the disconnected device.

3. The home network gateway apparatus according to claim 1, wherein, when an operation command to control a selected device is received from the terminal, said server controls the selected device.

4. The home network gateway apparatus according to claim 1, wherein the device comprises a video camera.

5. The home network gateway apparatus according to claim 1, wherein the device comprises a lamp.

6. A method for registering devices connected to a home network into a home network gateway apparatus, the home network gateway apparatus being connected to at least one device via the home network and to a download server, external of the home network, which stores screen creation information and device operation information associated with the device, the method comprising:

receiving, when at least one device is newly connected to the home network, identification information of the device and address information of the download server, outputted from the device;

accessing the download server in accordance with the address information received from the newly connected device;

downloading the screen creation information and the device operation information associated with the newly connected device from the download server based upon the identification information;

storing the downloaded screen creation information and the downloaded device operation information; and enabling a terminal to display the information, including screen creation information and device operation information, that enables selection of a device and control of a selected device from the terminal, upon receipt of an access signal from a terminal, the terminal being external of the home network.

* * * * *